(12) United States Patent
Lienert et al.

(10) Patent No.: US 10,903,599 B2
(45) Date of Patent: Jan. 26, 2021

(54) CABLE SEALING AND ARRANGEMENT WITH A HOUSING

(71) Applicant: Auto-Kabel Management GmbH, Hausen (DE)

(72) Inventors: Andreas Lienert, Wegberg-Arsbeck (DE); Amir Hossein Attarzadeh, Mönchengladbach (DE); Ralf Bodem, Meerbusch (DE)

(73) Assignee: Auto-Kabel Management GmbH, Hausen (DE)

( * ) Notice: Subject to any disclaimer, the term of this patent is extended or adjusted under 35 U.S.C. 154(b) by 0 days.

(21) Appl. No.: 16/647,251

(22) PCT Filed: Jun. 27, 2018

(86) PCT No.: PCT/EP2018/067203
§ 371 (c)(1),
(2) Date: Mar. 13, 2020

(87) PCT Pub. No.: WO2019/052703
PCT Pub. Date: Mar. 21, 2019

(65) Prior Publication Data
US 2020/0259291 A1 Aug. 13, 2020

(30) Foreign Application Priority Data
Sep. 15, 2017 (DE) .......... 10 2017 121 459

(51) Int. Cl.
*H01R 13/52* (2006.01)
*H01R 13/506* (2006.01)

(52) U.S. Cl.
CPC ....... *H01R 13/5205* (2013.01); *H01R 13/506* (2013.01)

(58) Field of Classification Search
CPC .................. H01R 13/5205; H01R 13/506
(Continued)

(56) References Cited

U.S. PATENT DOCUMENTS 4,018,979 A * 4/1977 Young ............... H02G 3/06
174/359
4,443,029 A * 4/1984 Laxo ............... F16L 23/08
285/367
(Continued)

FOREIGN PATENT DOCUMENTS

CN 101364686 A 2/2009
CN 105680236 A 6/2016
(Continued)

OTHER PUBLICATIONS

International Searching Authority/EPO, International Search Report and Written Opinion of the International Searching Authority, Application No. PCT/EP2018/067203, dated Oct. 5, 2018, *with English translation of the International Search Report*, 13 pages.
(Continued)

*Primary Examiner* — Alexander Gilman
(74) *Attorney, Agent, or Firm* — Sunstein LLP

(57) ABSTRACT

Cable sealing having a carrier formed as a hard component and having an opening, and a seal formed as a soft component and being arranged at least on the carrier. Protection against longitudinal water is achieved by the fact that the seal is formed from a silicone and is injection-moulded together with the carrier.

29 Claims, 6 Drawing Sheets

(58) Field of Classification Search
USPC .......................................................... 439/589
See application file for complete search history.

(56) References Cited

U.S. PATENT DOCUMENTS

| | | | | |
|---|---|---|---|---|
| 5,324,207 | A * | 6/1994 | Itoh | H01T 13/06 439/125 |
| 5,470,114 | A * | 11/1995 | Umney | F16L 23/08 285/347 |
| 6,364,703 | B1 * | 4/2002 | Ito | H01R 13/5208 439/589 |
| 6,409,541 | B1 * | 6/2002 | Hattori | H01R 13/5205 439/279 |
| 7,070,209 | B2 * | 7/2006 | Collins | F16L 41/06 285/133.21 |
| 7,523,963 | B2 * | 4/2009 | Draper | F16L 21/06 285/312 |
| 7,726,703 | B2 * | 6/2010 | Porter | F16L 17/04 285/364 |
| 8,820,795 | B2 * | 9/2014 | Dole | F16L 43/00 285/179 |
| 2009/0042442 | A1 | 2/2009 | Sakamoto et al. | |
| 2012/0247805 | A1 * | 10/2012 | Montena | H01R 4/646 174/78 |
| 2013/0090004 | A1 * | 4/2013 | Corbett | H01R 4/643 439/389 |
| 2014/0069904 | A1 * | 3/2014 | Sammons | H02G 15/113 219/136 |
| 2016/0104967 | A1 * | 4/2016 | Schmidt | H01R 13/5202 439/587 |
| 2017/0328507 | A1 * | 11/2017 | Sith | F16L 37/0915 |
| 2018/0048081 | A1 * | 2/2018 | Komori | H01R 9/11 |
| 2018/0109097 | A1 * | 4/2018 | Komori | H02G 15/013 |
| 2018/0366934 | A1 * | 12/2018 | Komori | B60R 16/0222 |
| 2019/0032825 | A1 * | 1/2019 | McNamara | F16L 41/021 |

FOREIGN PATENT DOCUMENTS

| | | |
|---|---|---|
| DE | 103 52 053 B4 | 6/2005 |
| DE | 10 2004 056859 B3 | 4/2006 |
| DE | 20 2010 016 873 U1 | 2/2011 |
| FR | 2 826 794 A1 | 1/2003 |
| JP | 2007250397 A | 9/2007 |
| JP | 2017112756 A | 6/2017 |
| WO | WO 2009/021647 A1 | 2/2009 |
| WO | WO 2011/061074 A1 | 5/2011 |

OTHER PUBLICATIONS

German Patent Office, Office Action, Application No. 10 2017 121 459.3, dated May 14, 2018, 6 pages.
China National Intellectual Property Administration, First Office Action, Application No. 201880060000.7, dated Oct. 10, 2020, 11 pages (English translation).

* cited by examiner

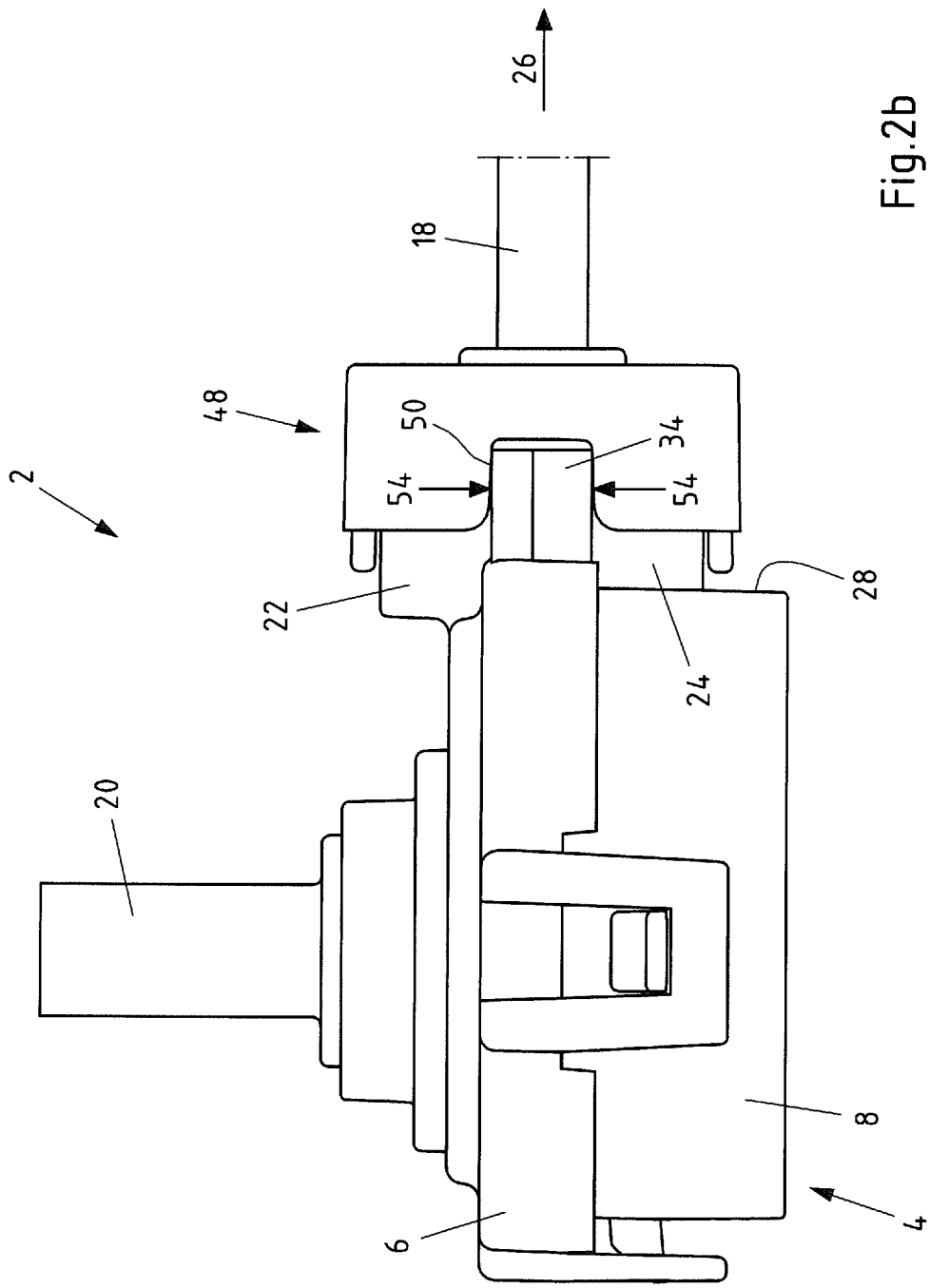

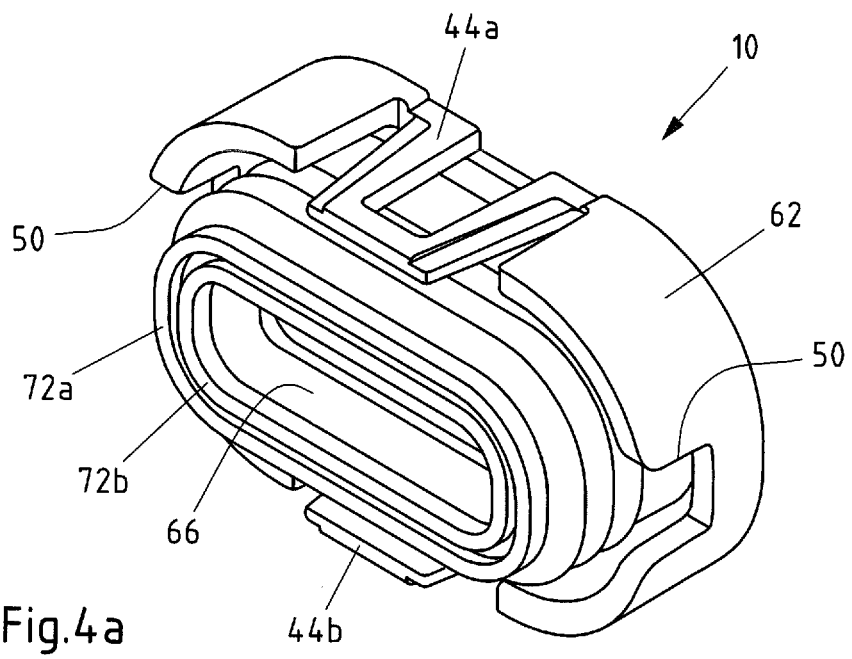
Fig.4a
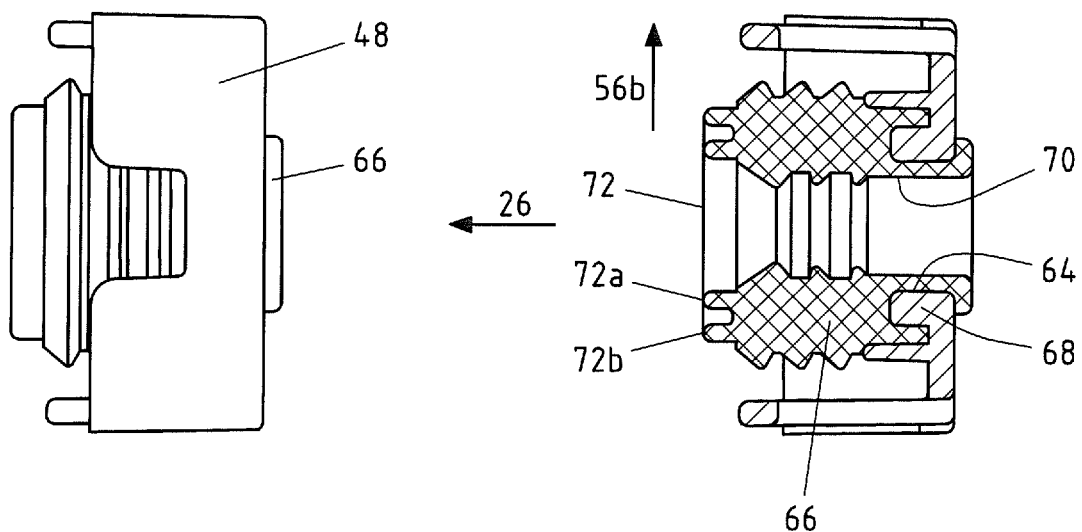
Fig.4b
Fig.4c

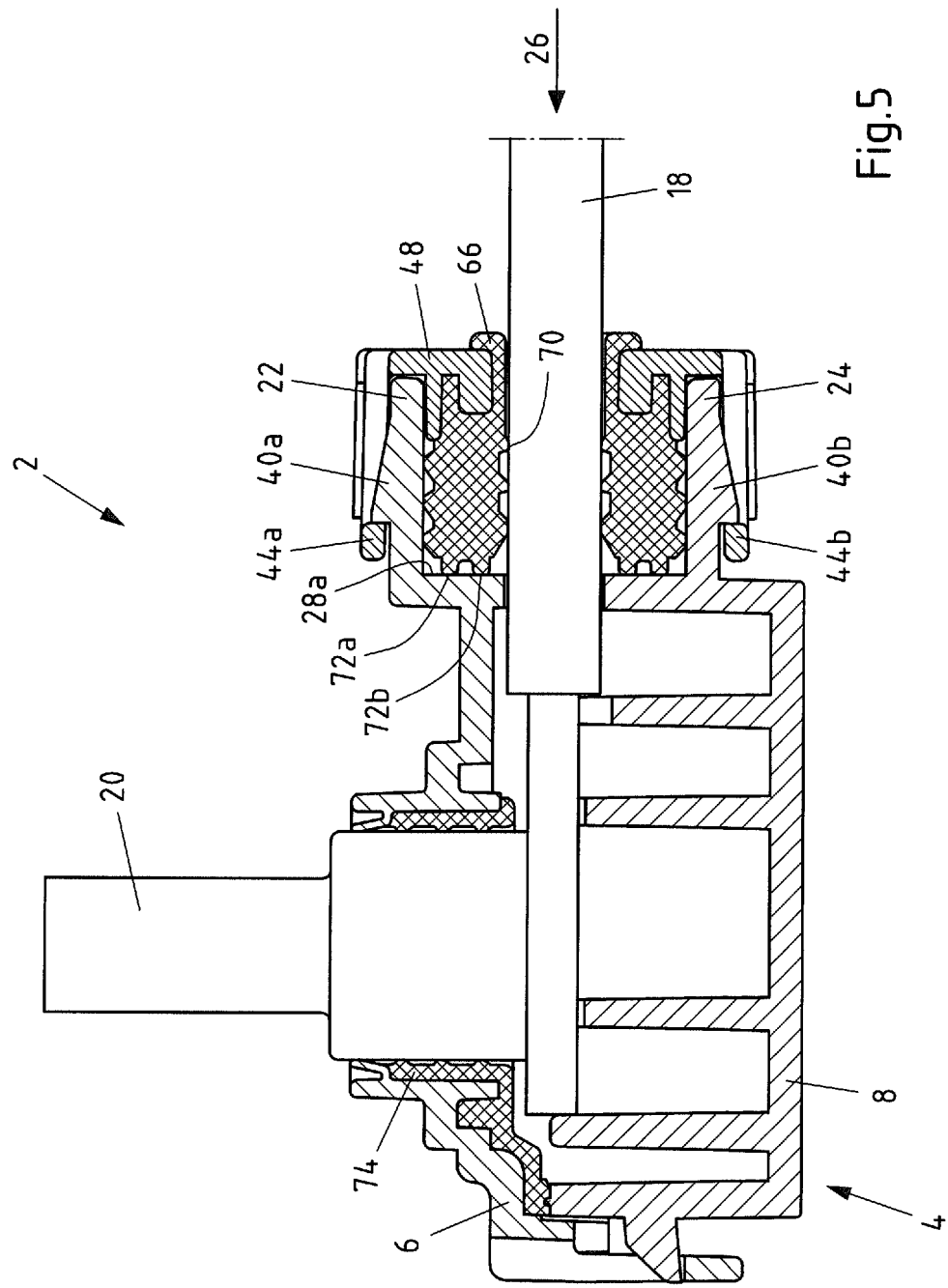

CABLE SEALING AND ARRANGEMENT WITH A HOUSING

CROSS-REFERENCE TO RELATED APPLICATIONS

This application is the national phase entry of international patent application no. PCT/EP2018/067203 filed Jun. 27, 2018 and claims the benefit of German patent application No. 10 2017 121 459.3, filed Sep. 15, 2017, the disclosures of which are incorporated herein by reference in their entirety.

TECHNICAL FIELD

The subject matter relates to a cable seal and an arrangement comprising a housing and a plug-in element and a cable.

BACKGROUND ART

In automotive engineering, electrical cabling is relevant to safety. Since vehicles are usually exposed to changing environmental conditions, such as rain, splash water, road salt, strong temperature fluctuations and the like, electrical connections are always sources of error with regard to corrosion. For battery cables which can in particular be permanently connected to the battery positive potential, the voltage applied to them can promote corrosion.

Usually, connections between two electrical cables are made via a cable lug and corresponding screw connections. It is important that the connection point is protected against moisture. Nowadays, this is usually achieved by means of shrink tubing, which is laid over the connection point and then shrunk. Such shrink tubing, especially in connection with silicone-covered cables, is problematic with regard to longitudinal water, which creeps between the shrink tubing and the cable insulation. A complete sealing is hardly possible here.

For battery cables in particular or for other high-voltage applications in the automotive industry, the so-called fording depth is a relevant criterion. Vehicles can only be immersed in water to a certain depth. This depth is called fording depth. In case of an underfloor installation of battery cables, the cables may lie below the fording depth of the vehicle. In particular, there is a danger that electrical cables laid in an underfloor installation, they may be permanently damaged when immersed in water.

For this reason, the subject matter was based on the object to protect the connection between at least two electrical cables within a motor vehicle against moisture.

SUMMARY OF THE INVENTION

The cable sealing according to the subject matter is in particular a single charger seal through which an insulated cable can be routed. However, several cables can also be inserted into the housing through one respective opening each, where each opening is sealed in the way described.

At many locations in the vehicle, intermetallic compounds must be protected from water, especially splash water. This is particularly relevant if the intermetallic compounds are not of the same type. This is often the case, for example, when threat bolts or other bolts are attached to flat cables. The bolts are usually made of stainless steel or copper alloys, such as brass, and the flat cable is made of aluminium. Other mixed connections are also possible.

Cable seals that form a housing around the intermetallic connection are suitable for protecting these connections.

Such a housing comprises of an upper part and a lower part. The upper part and lower part can each be shell-shaped and form the housing when joined. The cable with its intermetallic connection to e.g., another cable or a connection bolt or another connection part is arranged inside the housing in the joint state. The design of the housing comprising an upper part and a lower part has the advantage that a housing can be arranged at any point along the wiring harness. This can also be done after the initial manufacturing by placing the upper shell on the lower shell. However, the sealing of the housing in the area of the joining surface between upper and lower part is problematic, especially in the area of the cable entry. Since the cable entry must also guarantee an axial sealing of the cable, the projections are provided. These projections joining to the projection must also be radially tight in the area of the joint. To this end, it is proposed that the coupling element is designed so that it can exert a contact force between the upper and lower part in the joint state. This can be done using a plug-in element which can be pushed onto the projection and thus over the coupling element.

To insert the cable into the housing, an opening is provided in the housing. According to the subject matter, this opening is formed in an area between the upper part and the lower part. If the upper part is placed on the lower part, the side walls of the upper part and the lower part lie against each other. In one area of a wall, either the upper part or the lower part or upper and lower parts each have a recess which forms the opening when the housing is joined. Starting from this opening, a projection extends outwards in an axial direction on both the upper part and the lower part.

An axial direction is defined by an insertion direction of the cable into the opening. The axial direction can therefore be understood as a direction that is transverse, preferably substantially perpendicular to the outer surface in which the opening is formed. In particular, the axial direction is parallel to the surface normal of the surface in which the opening is formed in the joint state of the housing.

A radial direction is perpendicular to the axial direction. The radial direction is preferably the direction in which the opening extends. The radial direction preferably extends from the center of the opening to the outside. The opening can be oval, rectangular, round or similar. The opening is in particular adapted to the cross-section of the cable, which can in particular be rectangular in the case of a flat cable or round in the case of a round cable.

In the joint state, the upper part is placed on the lower part and the opening forms on an outer wall of the housing from the recesses on the upper part and/or lower part. Respective projections extend from this opening which lie against each other in the joint state and preferably circumferentially surround the opening. The projections are each arranged on an upper part and a lower part. The projections surround the respective recesses semicircularly. The two projections on the upper part and lower part have end faces on their side walls which face each other and, when joined, are at least partially in contact with each other via contact surfaces. The end faces are the edges of the projections extending away from the housing. A projection has two such end faces. Seen from the outside, the projections lying against each other form a first opening which extends inwards towards the housing or the outer wall of the housing. The projections lie against each other and form a preferably closed ring when joined.

The projections form an outer part of the opening and an inner part of the opening is formed in the outer wall of the housing. The outer part of the opening formed by the projections serves to accommodate a plug-in element, in particular a seal for a plug-in element, as described below.

To join the upper and lower part, they are first placed on top of each other. The projections are then placed against each other at their contact surfaces. In particular, the projections lie against each other on opposite sides of the inner part of the opening. At these parts of the projections lying against each other, radial partial coupling elements pointing outwards are provided. On the projection of an upper part as well as on the projection of a lower part, a partial coupling element extends radially outwards starting from the circumferential surface of the projection. The partial coupling element also has an extent in the axial direction. A partial coupling element thus protrudes radially from the outer lateral surface of the projection and extends axially along the projection at least in parts. The axial extent of the partial coupling element is in particular starting from the outer wall of the housing along the axial extent of the projection. A partial coupling element can end axially before an end surface edge of a projection, so that an area of the projection in the axial direction is free of a partial coupling element.

The partial coupling element extends along a joint edge between a projection of the upper part and a projection of the lower part. In the joint state, the projections are placed on top of each other on their end faces (joint edges). The partial coupling element extends from the joint edge, along the outer lateral surface of the projection, perpendicular to the axial direction. This extent can be understood as width extent.

The extent along the axial direction can be understood as the length extent. The extent in the radial direction can be understood as the depth extent.

In the joint state, the two partial coupling elements of the two projections form a coupling element. In the joint state, the coupling element serves to absorb a contact force with which the upper part and lower part are pressed against each other. In particular, a contact force is exerted in the area of the end faces so that a seal is produced in the area of the contact surfaces in particular. The coupling element can taper in an axial direction. A plug-in element which is plugged onto the projection can also have a receptacle for the coupling element and the receptacle can taper in the axial direction. In both cases, the tapering causes a force to act on the coupling element with which the upper and lower parts are pressed against each other. The extent in the width of the coupling element and/or the receptacle starting from the housing in the direction of the front edge of the projection can be reduced. Starting from the outer wall of the housing in the direction of a front edge of the projection, the coupling element formed from the partial coupling elements tapers or the receptacle of the plug-in element tapers along its extent in axial direction. The tapering can also be formed in only one of the partial coupling elements or both partial coupling elements can contribute to the tapering.

By means of this tapered coupling element or the tapered receptacle, it is possible, with the aid of a plug-in element which is pushed onto the coupling element, to create a contact force between the joint edges of the projections. A plug-in element can have a recess corresponding to the coupling element, where the recess preferably only extends in the width, like the coupling element in the region of its point of narrowest width, so that when the plug-in element is pushed further onto the projections, i.e. the recess onto the coupling element, the side walls of the recess press the partial coupling elements against each other.

Thus, the partial coupling elements, which in the joint state complement each other to form a single coupling element, enable the upper part and lower part of the housing to be fastened and sealed to each other, in particular in the area of the projection.

It goes without saying that it is also possible for the recess of the plug-in element to taper in width and for the coupling element to have a constant extent in width. Also, both the recess and the coupling element can have a tapered width. This tapers the width of the recess in the insertion direction of the coupling element.

As already explained, the projections embrace the opening on the outer wall of the housing. Thus the projections are semicircular. Contact surfaces are created at the respective joint edges at which the projections touch each other, respectively. A projection usually has two end faces whose contact surfaces come into contact with the corresponding contact surfaces of the other projection. In order to enable a good sealing, the end faces are preferably formed in tongue and groove form, so that one end face is formed as a groove and the corresponding end face as a spring. This leads to a protection of the contact surfaces, which cause the actual sealing between the projections.

According to an embodiment, it is proposed that the contact surface of at least a first of the projections has a soft component and that the contact surface of a second projection adjacent to the first projection has an elevation formed as a hard component which engages with the soft component in the joint state. The soft component is in particular designed as a seal. In particular, the soft component is in the area of the end face which is formed as a spring. The end face is formed, radially from the inside to the outside, first by the soft component and then by the spring. The tongue-and-groove combination thus protects the soft component from external influences.

On the other hand, the corresponding end face is preferably formed without a soft component and, for example, only by a hard component. An axial elevation can be provided in this hard component. The elevation can also be formed by a groove wall with which the tongue of the other end face engages. The elevation can intervene in the soft component in the joint state. This compresses the soft component and creates an optimized sealing in the area of the end face.

The soft component is preferably arranged circumferentially along a circumferential contact surface between the upper part and the lower part. The elevation is also preferably formed along the circumferential contact surface between the upper part and the lower part of the housing according to the soft component. The elevation is preferably arranged centrally on the end face with an equal distance to an outer edge of the end face on the end face.

According to an embodiment, it is proposed that the end faces extend axially along the projection. The upper part of the housing rests against the lower part of the housing also along the projection. The two projections which lie against each other extend in the axial direction and the end faces also lie against each other in the axial direction in the area of the projections. The contact surfaces preferably end at the front edge of the projection, in particular a few tenths of a millimeter before the front edge of the projection.

According to an embodiment, it is proposed that the end face is formed radially from the inside to the outside by first a soft component and then a hard component. The hard component juts out of the soft component in a projection parallel to the end face. If the course of the end face is viewed radially outwards, the soft component can be arranged as the first followed by the hard component. Here, the hard component can have a height extent extending perpendicularly to the end face that is greater than the height extent of the soft component. The hard component is preferably formed as a spring with which a corresponding groove of the corresponding end face of the corresponding projection engages.

As explained above, the soft component is located preferably circumferentially along a circumferential contact surface between the upper and lower parts. In particular, all contact surfaces located on the outer walls of the cable seal are formed by a soft component on the upper or lower side and a corresponding hard component on the respective other upper or lower side. The circumferential contact surfaces can be formed at the projections according to the description of the contact surfaces.

The opening in the outer wall of the housing is preferably sufficient to accommodate a cable, in particular a cable with insulation. The outer opening embraced by the projections preferably has a larger cross-section than the inner opening in the outer wall of the housing, since the outer opening embraced by the projections is formed to accommodate a seal of a plug-in element.

The plug-in element is inserted into the receptacle formed by the projections with its seal in a positive lock. The seal is then touching circumferentially against the inner wall of the receptacle formed by the projections.

It is proposed that the projections form a first opening cross section when joined. In the joint state, the recesses on the outer walls of the housing form a second opening in the area of the projections with a cross-section which is smaller than the cross section of the first opening. This smaller cross-section describes a bottom of the receptacle formed by the projections. This bottom penetrates through the opening in the outer wall. An end face of the seal of the plug-in element can lie against the bottom. When the plug-in element is pushed in, the seal of the plug-in element is pressed against the bottom with an axial force. A radial force, in particular a compression force, causes the seal to be pushed against the inner wall of the receptacle, which is formed by the projections.

The opening formed by the projections and the opening formed in the outer walls are preferably concentric. In particular, the bottom is formed circumferentially, preferably with an equal distance between the inner opening on the outer walls and the inner wall of the projections.

As already explained, the projections form a support for a plug-in element when they are joined.

The plug-in element is preferably provided on the housing into which the cable is to be inserted. It should be prevented that moisture penetrates into the housing in the area of the cable entry. At the same time, the plug-in element should be as modular as possible and be able to be used with a large number of housings. In this respect, it is proposed that the plug-in element is formed as a component independent of the housing, whereby the plug-in element is formed from a hard component and a soft component. The hard component serves to connect the plug-in element to the housing and can serve as a carrier for the soft component. An opening is preferably provided in the hard component, within which the soft component is arranged. The soft component is arranged on the plug-in element and designed as a seal.

For applications at high temperatures, especially above 125° C., silicone is usually used as insulation material for cables. Shrink tubing does not seal successfully against silicone. In order to provide a successful seal, it is proposed that the soft component is formed from a silicone.

For applications at low temperatures, especially below 105° C., TPE is usually used as the insulation material for cables. In this case, the soft component can also be formed from a TPE.

The processes and materials described below apply, as far as possible, both to the housing or housing parts and to the plug-in element.

For particularly process-optimized production, it is proposed that the soft components be injection-molded together with the hard component. In a joint injection moulding process, two different materials are preferably injected into a common injection mould. The seal is injected from a crosslinking silicone and the hard component is preferably injected from another plastic, for example PBT or the like, into the same injection mould.

The hard and soft components can preferably be designed in such a way that their materials meet the required strength requirements in a wide temperature range, especially between −40° C. and +180° C. The materials used in the injection moulding process are made of a different plastic, such as PBT or similar. This enables the cable sealing to be used in automotive applications.

As already explained, both hard and soft components are injected into a common injection-moulded housing. In this respect, it is proposed that the soft component be produced together with the hard component in a two-component injection moulding process. The two-component injection moulding process produces a one-piece component which, however, is made of two different materials, silicone in particular and another plastic, PBT in particular. The transition between the hard and soft components already occurs during production and the materials form a cross-linked transition. The materials can stick to each other by adhesion. The hard component is preferably stiffer than the soft component. The hard component can also have a higher modulus of elasticity than the soft component.

In order to attach the plug-in element to the housing, it is necessary to ensure a firm fit, in particular a loss-proof fit. It is also necessary for the seal to have a sufficient sealing effect against the cable or its insulation. The elastic deformation of the soft component should make it possible for cables to pass through the plug-in element and, at the same time, the restoring force of the soft component should ensure a sufficient sealing against water ingress. The hard component or plug-in element is preferably connected to the housing, which is preferably made of plastic, in a positive-locking, loss-proof manner.

According to an embodiment, it is proposed that the seal is located at least at the inner circumference of the opening of the plug-in element. The cable is pushed through the opening of the plug-in element through the cable seal. In the area of the opening of the plug-in element, the seal can touch the cable or its insulation.

According to an embodiment, it is proposed that the seal is arranged completely circumferentially around the inner circumference of the plug-in element opening. A fully circumferential seal ensures a tight seal against water ingress.

According on an embodiment, it is proposed that the seal of the plug extends axially beyond the opening of the plug-in element into a sealing section. The seal is preferably designed to seal the opening of the plug-in element from the cable on the one hand and the plug-in element from the housing on the other.

In the housing the opening is provided into which the cable can be inserted. The plug-in element can be attached to the projections on the outside of the housing. The plug-in element can completely embrace the projections. However, between the outside of the housing and the inside of the housing, the plug-in element must be sealed against the housing. For this purpose, the seal is provided which extends beyond the opening of the plug-in element in the axial direction and enables the plug-in element to be sealed to the housing and at the same time to the insulation of the cable by means of the seal section.

To enable a sealing against a housing wall, in particular against the inner wall of the projections, it is proposed that the sealing section extends radially beyond a boundary wall of the plug-in element opening. Thereby, the seal preferably has a larger diameter than the opening of the plug-in element. In particular, in the area of the sealing section, the seal protrudes beyond the boundary wall of the opening so as to enable mechanical contact with an opening in the housing, in particular with the inner walls of the projections which, when joined, form the outer opening with an inner circumference. The seal thus lies against the housing or the opening in the housing, in particular the inner wall of the projections, preferably circumferentially and thereby seals the plug-in element against the housing.

This is ensured by the fact that the sealing section has a greater extent in the radial direction than a boundary wall of the opening of the plug-in element. An opening is provided in the plug-in element, which is defined by a preferably circumferential boundary wall. The seal can be arranged at this boundary wall. The cable or cable with its insulation is pushed through the opening of the plug-in element defined by the boundary wall. At the boundary wall, the seal can be fitted with a counter bearing so that the seal is compressed between the cable and the boundary wall when the cable is inserted. This creates a restoring force which serves to seal the cable in the opening of the plug-in element. At the same time, the boundary wall or the outer circumferential surface of the boundary wall can limit the plug-in element with respect to the housing.

In order to be able to fasten the plug-in element to the housing in a sealed manner, the seal also extends radially outwards across the boundary wall, so that it can also rest against a housing wall, in particular the inner walls of the projections, and also seal. The two regions of the seal, the sealing area on the cable and the sealing area on the housing, can also be formed spatially separated from each other as two separate region.

According to an embodiment, it is proposed that the seal should have at least one radially inward pointing projection. In particular, the seal has radially inward pointing projections arranged axially side by side. A series of several projections one behind the other makes it easier to insert the cable into the opening. In the case of an axial movement, the seal can thus give elastically in the area of the projections, making it easier to insert the cable. Radial projections can also be formed as radially outward pointing projections, so that the cable seal can be easily pushed into the housing.

In particular, the sealing of flat cables, in particular of aluminium flat cables, has not yet been completely solved. Flat aluminium cables usually have a rectangular profile and must preferably be connected to a copper cable at a transition point for connection to other electrical loads in a motor vehicle. In the area of this connection between the aluminium flat conductor and the copper cable, special protection against moisture is necessary, as contact corrosion is highly problematic. Cable sealing in the sense of the object for a rectangular cable profile is possible if the opening of the plug-in element and/or the housing also has a rectangular profile. A flat cable with a rectangular profile can then be inserted into such a cable seal and thus be connected to a copper cable in a housing, for example.

It is also advantageous if the plug-in element has at least one fastener on its outer circumference to fasten it to the housing. The plug-in element is fixed to the housing so that it holds the cable seal to the housing in a loss-proof manner.

The fasteners are used to pull the plug-in element axially in the direction of the housing. This exerts a force on the recesses formed in the plug-in element, which is pushed over the coupling elements. This tensile force causes a compression force of the partial coupling elements against each other. In this way it is achieved, that the upper part is pressed against the lower part of the housing in the joint state. This also achieves, that sealing in the radial direction is ensured in the area of the projections lying against each other.

According to an embodiment, it is proposed that the fastener can be detachably fastened to a housing, in particular that the fastener is at least part of a snap connection. The housing may have a recess, groove or projection in the region of its opening into which the cable seal is inserted, with which the fastener of the cable seal can form a positive locking connection. In particular, the fastener can be used to form a positive locking connection to the housing in such a way that subsequent movement of the plug-in element in the axial direction is prevented. A rotary movement can also be prevented by the fasteners in the opening of the housing.

In the inserted state, the cable seal seals against the housing by means of its seal. In particular, the seal can be elastically deformed against an inner wall of the cable bushing.

The seal on the plug-in element extends in the axial direction in such a way that in the connected state, i.e. when the plug-in element is fastened to the housing, an end face of the seal lies circumferentially against the base in the inner opening. By latching the fasteners to an elevation on the outside of the projections, an axially directed pressure force can press the seal against the bottom of the housing.

The hard component of the connector preferably extends axially from an outer end face of the connector in which the opening for the cable is provided. The plug-in element is formed in such a way that it completely embraces the projections on the housing in the joint state. The fasteners can preferably be arranged on two opposite sides. The recess corresponding to the coupling elements can also be arranged on two opposite sides of the plug-in element.

Another aspect is an arrangement with an electrical cable and a cable seal with a housing.

BRIEF DESCRIPTION OF THE DRAWINGS

In the following, the subject matter is explained in more detail using a drawing showing embodiments. In the drawings show:

FIG. 2b the cable seal according to FIG. 1 in side view with plug-in element in fastened position;
FIG. 4a-c different views of a plug-in element;
FIG. 5 a cross-sectional view through a cable seal according to FIG. 1.

DETAILED DESCRIPTION OF SPECIFIC EMBODIMENTS

Figure 1:
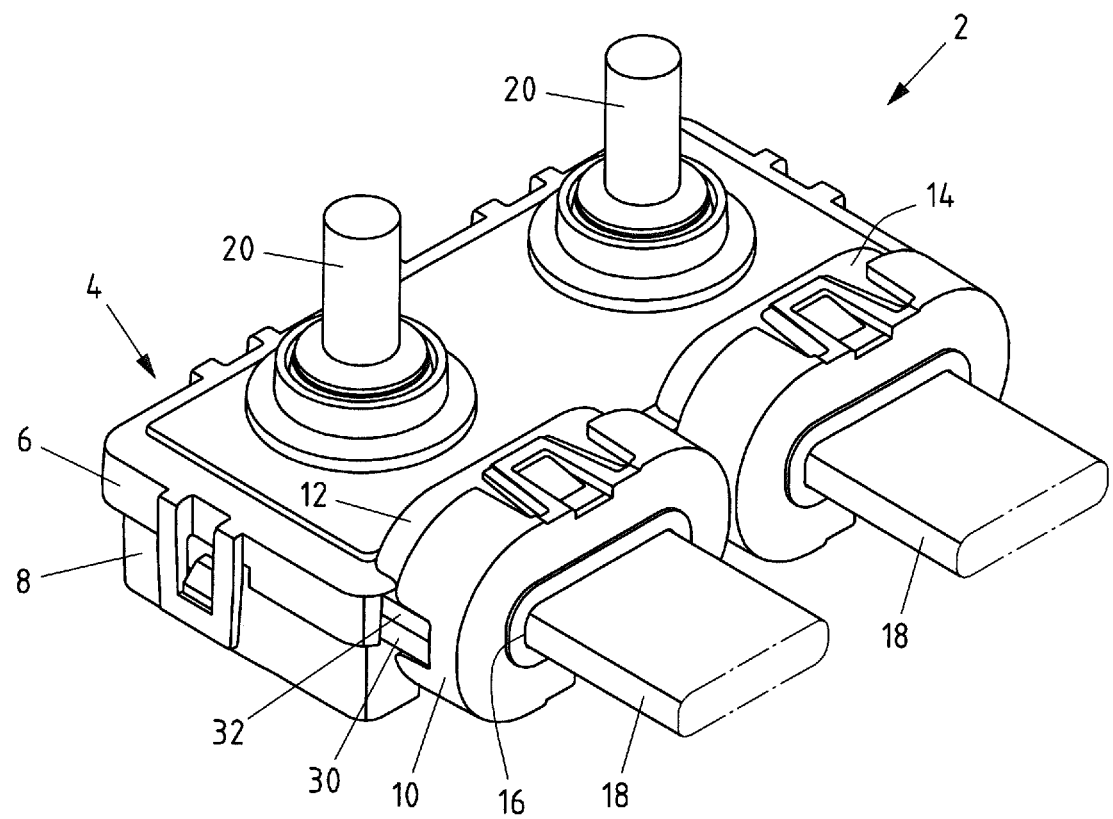
FIG. 1 a cable seal in a view according to an embodiment.

FIG. 1 shows a cable seal 2 with a housing 4 with an upper part 6 and a lower part 8. The upper part 6 and the lower part 8 are joined together by means of a plug-in element 10 which is pushed onto projections 22, 24. A preferably insulated cable 18 is led through an opening 16 of the plug-in element 10. The cable seal 2 is provided for two cables 18, but the described seal can be prepared for any number of cables 18.

In the cable seal 2, a bolt 20 is welded to each of the cables 18 formed as flat cables. In the area of this transition from cable 18 to bolt 20, a metallic connection may be formed which can be mixed and which must be protected against corrosion. For this reason, cable sealing 2 is provided.

Figure 2A:
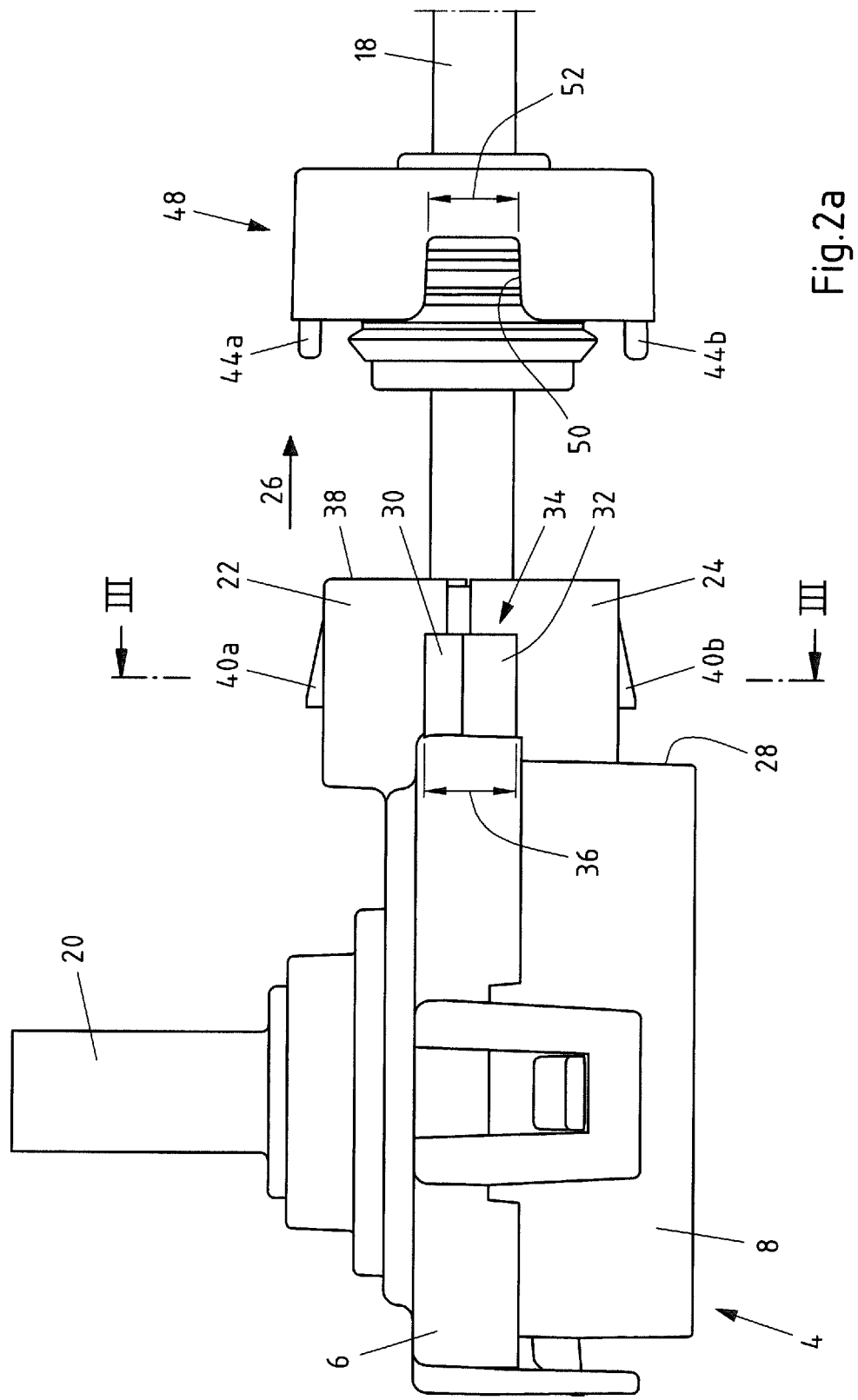
FIG. 2a the cable seal according to FIG. 1 in a side view with plug-in element in unfastened position.

FIG. 2a shows a cable seal 2 according to FIG. 1 in a side view. A cable 18 is plugged into the housing 4. It can be seen that both on the upper side 6 and on the lower side 8 a projection 22, 24 is provided. The projections 22, 24 extend in axial direction 26 away from a housing wall 28.

It can be seen that a partial coupling element 30, 32 is provided on each respective projection 22, 24, which are joined to form a coupling element 34 in the joint state shown. The coupling element 34 extends from the housing wall along the projections 22, 24 in axial direction 26. It thus has an extent in one length. In addition, the coupling elements 30, 32 extend in a width of 36. The projections 22, 24 join to the projections 12, 14 according to FIG. 1 in the joint state.

The extent in the width 36 changes in the axial direction 26. Here the coupling element 34 tapers starting from the housing wall 28 in the direction of an end face 38 of the projections 22, 24. It is also possible, however, that the extent in the width 36 is constant, but then the recess 50 of the plug-in element 48 is tapered, as described below.

The coupling elements 30, 32 are arranged on opposite sides of the projections 22, 24. Furthermore, elevations 40a, 40b are provided on the outer surface of the projections 22, 24, which correspond with fastening means 44a, 44b of a plug-in element 48.

The plug-in element 48 has recesses 50, which are provided on opposite sides of the plug-in element 48. The recesses 50 correspond to the coupling elements 34. The extent in width 52 can be constant in the axial direction 26. The extent in width 52 can also be tapered in the axial direction. In both cases the extent in the width 52 of the recess 50 can be at least in parts smaller than the extent in the width 36 of the coupling element 34.

This results in the recess 50 compressing the coupling element 34 when pushing the plug-in element 48 onto the projections 22, 24, as shown in FIG. 2b. This creates a pressing force 54 with which the projections 20, 24 are pressed onto each other. This presses the end faces of the projections 22, 24 against each other. This results in the projections 22, 24 being sealed in the area of their joint seam.

Figure 3:
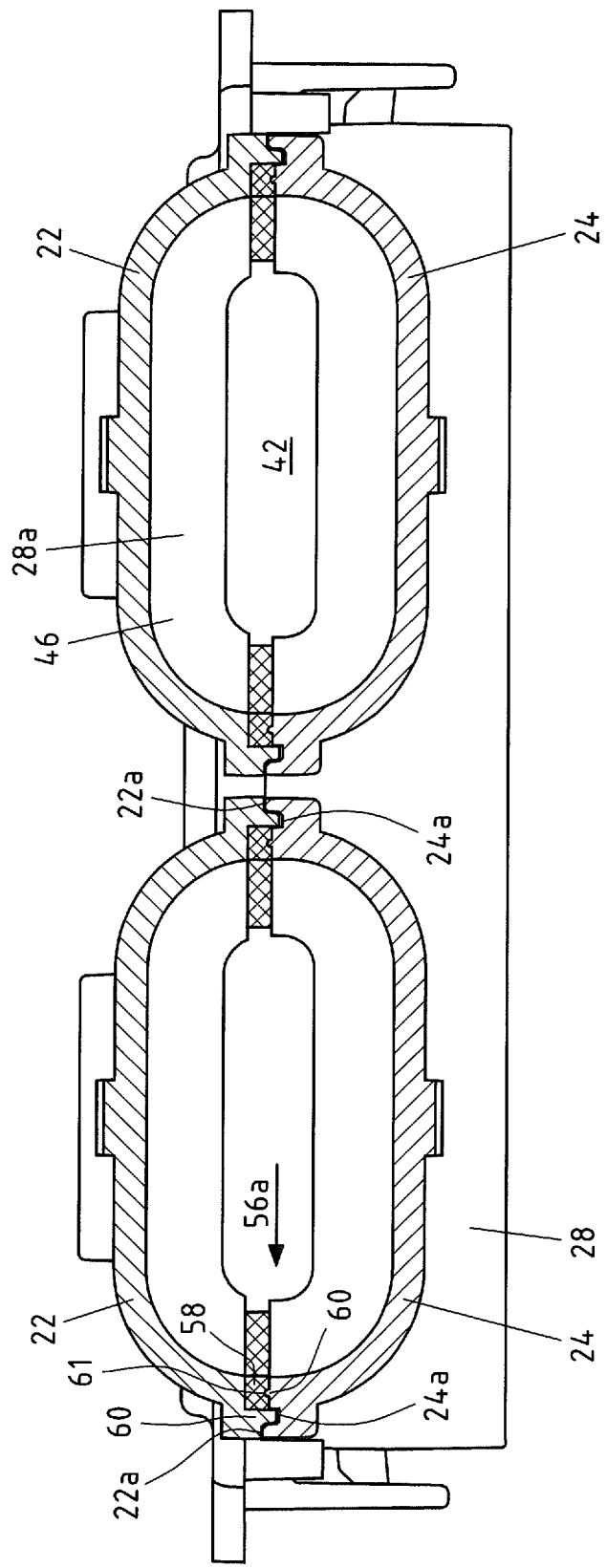
FIG. 3 a cable seal according to FIG. 1 in a sectional view.

This sealing is explained in more detail in FIG. 3. FIG. 3 shows a sectional view through the projections in a plane parallel to the housing wall 28. It can be seen that the projections 22, 24 have end faces 22a, 24a. The end face 22a has a soft component 58 as contact surface. The end face 24a has a raised area or nose as contact surface. At least at the contact surfaces the end faces 22a, 24a are in contact with each other. The end faces 22a, 24a are at least in parts profiled correspondingly to each other. It can be seen that the end face 22a in radial direction 56a is formed firstly from a soft component 58 and then from a hard component 60. The end face 24a of the projection 24 is formed entirely from a hard component 60.

It can also be seen that the end faces 22a, 24a are formed in the manner of a tongue-and-groove joint, where a tongue of the end face 22a engaging with a groove of the end face 24a.

In addition, it can be seen that the spring of the end face 22a protrudes beyond the soft component 58. This provides additional protection as the soft component is not directly exposed to the influx of media from the outside (in the opposite direction to 56a).

Furthermore, it can be seen that an elevation 61 is formed in the form of, for example, a nose in one of the end faces 24a, 22a. The shown elevation 61 is formed in the end face 24a. The elevation 61 engages with the soft component 58 in the joint state. By pushing on the plug-in element 48 as described, the projections 22, 24 are pressed against each other so that the end faces 22a, 24a are pressed against each other with a force. Here, the elevation 61 penetrates into the soft component 58 and leads to a sealing in radial direction 56a.

Further, FIG. 3 shows that the housing has an inner opening 42 on its housing wall 28 and an outer opening 46 circumscribed by projections 22 and 24.

Between the inner opening 42 and the outer opening 46 there is a bottom 28a on the housing wall 28. The bottom 28a goes around the inner opening 42 circumferentially and from the outer wall of upper part 6 and lower part 8 as well as in the region of the transition between upper part 6 and lower part 8 from a soft component 58. The projections 22, 24 completely enclose the outer opening 46 in the joint state.

FIG. 4a shows a view of a plug-in element 48. It can be seen that the plug-in element 48 has a circumferential lateral surface 62, which completely surrounds the projections 22, 24 in the joint state. It can also be seen that the recess 50 is provided on both sides on opposite sides of the plug-in element 48 on the outer lateral surface 62. It is also shown that the fastening means 44a, 44b are formed on opposite sides of the plug-in element 48.

An opening 64 is provided in the plug-in element 48, in which a seal 66 is arranged.

The opening 64 is circumferentially bounded by a boundary wall 68. The seal 66 lies circumferentially against the boundary wall 68, as can be seen in FIG. 4c.

The seal 66 extends in axial direction 26 beyond the opening 64. In addition, seal 66 extends in radial direction 56b beyond aperture 64.

FIGS. 4b and c show how the seal 66 is profiled. In the radial direction 56b, the surface of an outer circumferential lateral surface of the seal 66 is wavy, resulting in regions that have a greater radial extent than other regions. By this wave form it is achieved, that the seal 66 is in contact with the inner walls of the projections 22, 24 in the joint state.

An inner circumferential lateral surface 70 of the seal 66 is also wavily profiled. This ensures a particularly good sealing of the cable 18 in the inserted state. Finally, at the end face 72 the seal 66 is formed with two sealing strips 72a, b, which are circumferential. The sealing strips 72a, b rest on the bottom of an opening in the housing, as will be shown below.

FIG. 5 shows the cable seal 2 in the joint state. The plug-in element 48 is pushed onto the projections 22, 24. The fasteners 44a, b are engaged in the elevations 40a, b, whereby a force in axial direction 26 is exerted on the end face 72 of the seal 66 and the sealing strips 72a, 72b are pressed against the base 28a.

Further, it can be seen that the seal 66 with the profiled cross section is in contact with the outer lateral surface of the housing on the inside of the projections 22, 24. The cable 18 is in contact with the inner lateral surface 70 of the seal 66.

The upper side 6 is pressed against the lower side 8 of the housing 4 by the contact force through the recess 50 against the coupling element 34.

FIG. 5 also shows that the cable 18 in the housing 4 is connected to the bolt 20. The bolt 20 is sealed against the inside of the housing 4 by a seal 74.

REFERENCE SIGNS 2 cable sealing
4 housing
6 upper part
8 lower part
10 plug-in element
12, 14 projection
16 opening
18 cable
20 bolt
22, 24 projection
22a, 24a face area
26 axial direction
28 housing wall
30, 32 partial coupling element
34 coupling element
36 width extent
38 end face
40a, b elevation
42 inner opening
44a, b fasteners
46 outer opening
48 plug-in element
50 recess
52 width extent
54 pressing force
56a, b radial direction
58 soft component
60 hard component
61 elevation
62 lateral area
64 opening
66 seal
68 boundary wall
70 inner lateral surface
72 end face
72a, b sealing strips
74 seal

What is claimed is:

1. Cable sealing comprising:
   a housing in at least two parts with an upper part and a lower part,
   an opening arranged as a cable entry into the housing,
   the upper part and the lower part each forming a part of the opening, and
   the opening is formed at least in parts from projections pointing outward in an axial direction from an outer wall of the housing, one of the projections being arranged on the upper part and one of the projections being arranged on the lower part,
   wherein in a joint state of the housing, parts of the projections which lie against each other have partial coupling elements which extend in a radial direction, the partial coupling elements complementing each other, in the joint state, to form a coupling element via which a pressing force between the upper part and the lower part can be received in the region of the projections,
   wherein the projections form a receptacle for a plug-in element in the joint state, the plug-in element has an opening for a cable, and a soft-component is arranged circumferentially at the inner circumference of the opening of the plug-in element as a seal and a hard component is arranged circumferentially at the outer circumference of the opening of the plug-in element,
   wherein in the joint state, the projections form a first opening cross-section in the joint state and in that, outer walls lying against each other in the joint state form a second opening cross-section in the region of the projections which is smaller than the first opening cross-section.

2. Cable sealing of claim 1,
   wherein the projections lying against each other have end faces facing each other and the end face of a first of the projections is formed as a groove and the end face of a second projection lying against the first projection is formed as a tongue.

3. Cable sealing of claim 2,
   wherein the end faces are formed radially outwards by a soft component and a hard component, the hard component projecting over the soft component in a projection parallel to the end face.

4. Cable sealing of claim 3,
   wherein the soft component is arranged circumferentially along a contact surface between the upper part and the lower part.

5. Cable sealing of claim 1,
   wherein the projections lying against each other have end faces facing each other, and the end face of a first of the projections has a soft component, and in that the end face of a second projection lying against the first projection has a projection which elastically engages with the soft component in the joint state.

6. Cable sealing of claim 1,
   wherein the plug-in element has at least one recess, the recess engaging with the coupling element in the joint state, thus exerting the pressing force on the upper part and lower part, in particular in that the recess tapers in the axial direction and/or the coupling element tapers in the axial direction.

7. Cable sealing of claim 1,
   wherein the seal extends in the axial direction beyond the opening into a sealing section and wherein the sealing section has a greater extent in the radial direction than a boundary wall of the opening of the plug-in element.

8. Cable sealing of claim 1,
   wherein the seal has at least one projection pointing radially inwards, in particular in that the seal has projections arranged axially next to each other and pointing radially inwards.

9. Cable sealing of claim 1,
   wherein the opening of the plug-in element and/or the opening of the housing has a rectangular or round profile.

10. Cable sealing of claim 1,
    wherein the plug-in element has on its outer circumference at least one fastening means for fastening to the housing.

11. Cable sealing of claim 10,
    wherein the fastening means can be detachably fastened to a housing, in particular in that the fastening means is part of a snap connection.

12. Cable sealing of claim 10,
wherein the fastening means embraces the opening in a U-shape.

13. Cable sealing of claim 1,
wherein the seal is arranged between the projections in the joint state and the hard component embraces the projections in the joint state.

14. Arrangement with a cable sealing of claim 1 and an electric cable, wherein the electric cable is sheathed with an insulation and passed into the housing of the cable sealing.

15. Cable sealing comprising:
a housing in at least two parts with an upper part and a lower part,
an opening arranged as a cable entry into the housing,
the upper part and the lower part each forming a part of the opening, and
the opening is formed at least in parts from projections pointing outward in an axial direction from an outer wall of the housing, one of the projections being arranged on the upper part and one of the projections being arranged on the lower part,
wherein in a joint state of the housing, parts of the projections which lie against each other have partial coupling elements which extend in a radial direction, the partial coupling elements complementing each other, in the joint state, to form a coupling element via which a pressing force between the upper part and the lower part can be received in the region of the projections,
wherein the projections form a receptacle for a plug-in element in the joint state, the plug-in element has an opening for a cable, and a soft-component is arranged circumferentially at the inner circumference of the opening of the plug-in element as a seal and a hard component is arranged circumferentially at the outer circumference of the opening of the plug-in element,
wherein the plug-in element has at least one recess, the recess engaging with the coupling element in the joint state, thus exerting the pressing force on the upper part and lower part, in particular in that the recess tapers in the axial direction and/or the coupling element tapers in the axial direction.

16. Cable sealing of claim 15,
wherein the projections lying against each other have end faces facing each other and the end face of a first of the projections is formed as a groove and the end face of a second projection lying against the first projection is formed as a tongue.

17. Cable sealing of claim 16,
wherein the end faces are formed radially outwards by a soft component and a hard component, the hard component projecting over the soft component in a projection parallel to the end face.

18. Cable sealing of claim 17,
wherein the soft component is arranged circumferentially along a contact surface between the upper part and the lower part.

19. Cable sealing of claim 15,
wherein the projections lying against each other have end faces facing each other, and the end face of a first of the projections has a soft component, and in that the end face of a second projection lying against the first projection has a projection which elastically engages with the soft component in the joint state.

20. Cable sealing of claim 19,
wherein the end faces extend axially along the projection.

21. Cable sealing of claim 15,
wherein the seal extends in the axial direction beyond the opening into a sealing section.

22. Cable sealing of claim 21,
wherein the sealing section extends in the radial direction beyond a boundary wall of the opening of the plug-in element.

23. Cable sealing of claim 21,
wherein the sealing section has a greater extent in the radial direction than a boundary wall of the opening of the plug-in element.

24. Cable sealing of claim 15,
wherein the seal has at least one projection pointing radially inwards, in particular in that the seal has projections arranged axially next to each other and pointing radially inwards.

25. Cable sealing of claim 15,
wherein the plug-in element has on its outer circumference at least one fastening means for fastening to the housing.

26. Cable sealing of claim 25,
wherein the fastening means can be detachably fastened to a housing, in particular in that the fastening means is part of a snap connection.

27. Cable sealing of claim 25,
wherein the fastening means embraces the opening in a U-shape.

28. Cable sealing of claim 15,
wherein the seal is arranged between the projections in the joint state and the hard component embraces the projections in the joint state.

29. Arrangement with a cable sealing of claim 15 and an electric cable, wherein the electric cable is sheathed with an insulation and passed into the housing of the cable sealing.

* * * * *